S. A. ASQUITH.
SPEEDOMETER.
APPLICATION FILED JULY 3, 1914.
1,164,908. Patented Dec. 21, 1915.
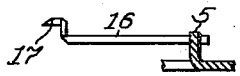
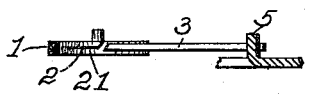
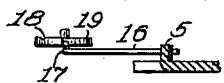
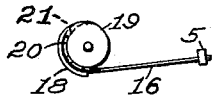
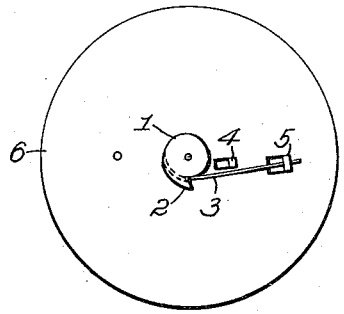
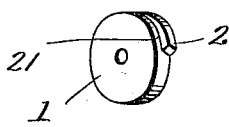
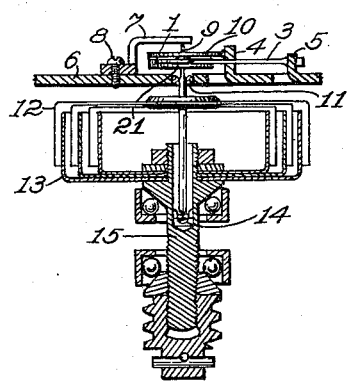
Witnesses:
Pearl Stanton
C. C. Lindner
Inventor,
S. A. Asquith, by
G. C. Kennedy,
Attorney.

UNITED STATES PATENT OFFICE.

STEAD A. ASQUITH, OF WATERLOO, IOWA.

SPEEDOMETER.

1,164,908.  Specification of Letters Patent.  Patented Dec. 21, 1915.

Application filed July 3, 1914. Serial No. 848,984.

*To all whom it may concern:*

Be it known that I, STEAD A. ASQUITH, a citizen of the United States of America, and a resident of Waterloo, Blackhawk county, Iowa, have invented certain new and useful Improvements in Speedometers, of which the following is a specification.

My invention relates to improvements in speedometers, and the object of my improvement is to provide damping means for acting upon the driven parts used in the apparatus to prevent excessive oscillations thereof and render its action equable and uniform. This object I have accomplished by the means which are hereinafter described and claimed, and which are illustrated in the accompanying drawings, in which:

Figure 1 is a vertical axial section of the mechanism of a speedometer, showing my improved damping means operatively connected therewith, and with parts of said apparatus broken away. Fig. 2 is an upper plan view of the parts shown in said Fig. 1, with the spiral spring removed. Fig. 3 is a detail view in partial section on a somewhat larger scale of the disk mounted on the spring-carrying spindle, and the damping spring in operative contact with said disk. Fig. 4 is a like view, showing a modified form of the latter spring, with the disk omitted. Fig. 5 is a like view to that of said Fig. 3, with a modified form of disk used in combination with the form of spring shown in said Fig. 4. Fig. 6 is an upper plan view of the parts shown in said Fig. 5. Fig. 7 is a detail perspective view of the cam-disk.

Similar numerals of reference denote corresponding parts throughout the several views.

Referring first to Fig. 1, the numeral 15 denotes a rotary driving head carrying a plurality of spaced concentric upwardly opening cups 13. Said driving head is mounted in ball bearings, and is driven by operative connections to the carrying wheels of the vehicle. The numeral 9 denotes a rotary spindle of much smaller diameter than the driving head 15, and having its lower portion seated in jeweled step bearings 14 in the bottom of an axial hollow in the upper end of said driving head. Said spindle 9 carries a plurality of spaced concentric cups 12 opening downwardly and which depend between said other cups 13 but not far enough to touch the bottom of the cups 13. The upper part of said spindle 9 is rotatably mounted in a jeweled bearing 11, in a fixed support plate 6, and extends therethrough in a diminished diameter to the bracket arm 7, which latter is fastened to the support 6 by means of the screw 8. The numerals 4 and 5 denote upright projections punched upwardly from the supporting plate 6 at varying distances from the spindle 9, and a spiral spring 10 has its outer end secured to the projection 4 while the inner end of said spring is secured to the upper end of said spindle 9. The numeral 1 denotes a cam-disk secured on the spindle 9 just below the spiral spring 10, and a narrow flat spring 3 has one end in rubbing contact with the circumferential edge of said disk, the other end of said spring 3 being secured to the other upright projection 5.

Referring to Fig. 2, the disk 1 is shown after the removal of the spiral spring 10. The disk 1 is preferably made as shown, with its circumferential bearing edge of spiral form and provided with a detent 2 which, as shown in Fig. 3, is cut away on its lower side so as to be approximately but one-half the thickness of the disk itself to leave a shelf 21, and has its lateral edge or point beveled off. The flat spring 3 also has its free end beveled in the same direction and lies in the path of movement of the detent 2 as the disk 1 rotates.

In Figs. 4 and 6, inclusive, is shown a spring 16 answering to the other spring 3 and similarly mounted, whose free end is bent upon itself twice in such a manner as to provide a short offset extremity 17. In said Figs. 5 and 6 is also shown a modified form of cam-disk 19 which answers to the other cam 1 and which is also of spiral contour, but the detent thereon is prolonged spirally at 18 about a considerable arc of the circumferential edge of the cam to provide an interspace 20, into which extends the curved extremity 17 of the spring 16 to effect a rubbing contact with said cam.

The cam-disk 1 and said spring 3, also the similar cam 19 and spring 16 are used to equalize the movements of the driven cups 12, to dampen or remove the vibrations thereon caused by unusual jolts of the vehicle which would render the indicating means unsteady. Since the indicating numerals are placed on the outer periphery of the outermost cup 12 so as to be seen in succession through a window provided in the casing of the speedometer, any unusual vibrations or jars are reproduced in magnified form on the very light and easily moved cups 12, so that the dampening effect thereon produced by the rubbing of the spring 3 over the edge of the cam 1 is necessary to prevent such vibrations and render the index steady at all times. The driving-head 15 with its attached cups 13, moves the air thereabout to exert an air-pull on the cups 12 to drive the latter against the tension of the spring 10, winding the latter more or less according to the speed of rotation. The spiral form of the cam 1 causes it to progressively increase the dampening effect as the speed of the vehicle increases, which is necessary, since vibrations are more numerous and more powerful with such increase of speed.

The spring 3 might drop over the cam-detent because the bevel on its end causes it to engage and slide off the beveled wall of the detent upon said shelf when the speed limit of the device is exceeded, but will fall upon the side shelf of the cam and will not lock with the detent, but the cam is free to move under it as before to the right place. The modified form of disk and spring shown will work in the same manner, returning the cam to its right position under the rubbing spring.

Having described my invention, what I claim as new, and desire to secure by Letters Patent, is:

1. In a speedometer, a fixed support, a rotary shaft mounted therein, a yieldable resilient connection between said shaft and said support, a cam mounted on said shaft and having its rubbing edge interrupted at one point abruptly from one level to another and beveled laterally, a by-pass shelf along one side of said interrupted part in communication with the rubbing edge at both ends, and a brush mounted on said support flexibly and adapted to rub upon said cam-edge passing over said interrupted part and pushed by its beveled edge upon said by-pass shelf.

2. In a speedometer, a support, a rotatable shaft therein, a cam having a spiral edge and mounted on said shaft with an abrupt fall from its point of widest to its point of least diameter, said cam being cut away on one side to provide a shelf therealong past said point of change of diameters to communicate from said place of least diameter to a place on the cam edge spaced from said point, the projection formed at said place of transition being beveled laterally toward its cut away side, and a flat spring mounted on said support and having its free end seated in rubbing contact with said cam edge in the plane of the same and having its extremity beveled obliquely in the same direction as the bevel of said projection to engage the latter when the cam is rotated a certain distance to be pushed thereby upon said shelf.

Signed at Waterloo, Iowa, this 18th day of June, 1914.

STEAD A. ASQUITH.

Witnesses:
  G. C. KENNEDY,
  PEARL STANTON.

Copies of this patent may be obtained for five cents each, by addressing the "Commissioner of Patents, Washington, D. C."